US008762962B2

(12) United States Patent  (10) Patent No.: US 8,762,962 B2
Ben-Artzi et al.  (45) Date of Patent: Jun. 24, 2014

(54) METHODS AND APPARATUS FOR AUTOMATIC TRANSLATION OF A COMPUTER PROGRAM LANGUAGE CODE

(75) Inventors: Guy Ben-Artzi, Palo Alto, CA (US); Yotam Shacham, Palo Alto, CA (US); Yehuda Levi, Rishon Lezion (IL); Russell William McMahon, Woodside, CA (US); Amatzi Ben-Artzi, Palo Alto, CA (US); Alexei Alexevitch, Hertzlia (IL); Alexander Glyakov, Petach Tikva (IL); Tal Lavian, Sunnyvale, CA (US)

(73) Assignee: Beek Fund B.V. L.L.C., Dover, DE (US)

( * ) Notice: Subject to any disclaimer, the term of this patent is extended or adjusted under 35 U.S.C. 154(b) by 1409 days.

(21) Appl. No.: 12/484,622

(22) Filed: Jun. 15, 2009

(65) Prior Publication Data

US 2009/0313613 A1  Dec. 17, 2009

Related U.S. Application Data

(60) Provisional application No. 61/132,264, filed on Jun. 16, 2008.

(51) Int. Cl.
    *G06F 9/45*  (2006.01)
    *G06F 11/00*  (2006.01)
(52) U.S. Cl.
    USPC .............. 717/137; 717/143; 717/139; 714/52
(58) Field of Classification Search
    USPC ................................................. 717/136–139
    See application file for complete search history.

(56) References Cited

U.S. PATENT DOCUMENTS

| 5,768,564 | A  | * | 6/1998  | Andrews et al. | 717/137 |
|-----------|----|---|---------|----------------|---------|
| 6,317,871 | B1 | * | 11/2001 | Andrews et al. | 717/137 |
| 6,378,126 | B2 | * | 4/2002  | Tang           | 717/143 |
| 6,886,115 | B2 | * | 4/2005  | Kondoh et al.  | 714/52  |
| 2003/0145011 | A1 | * | 7/2003  | Su et al.     | 707/100 |
| 2004/0031023 | A1 | * | 2/2004  | Li            | 717/140 |
| 2004/0111694 | A1 | * | 6/2004  | Wang et al.   | 717/100 |
| 2004/0237072 | A1 | * | 11/2004 | Gelissen      | 717/139 |
| 2005/0097514 | A1 | * | 5/2005  | Nuss          | 717/114 |
| 2006/0212859 | A1 | * | 9/2006  | Parker et al. | 717/143 |
| 2006/0288028 | A1 | * | 12/2006 | Waldvogel et al. | 707/101 |
| 2007/0234285 | A1 | * | 10/2007 | Mendoza et al. | 717/114 |
| 2008/0141230 | A1 | * | 6/2008  | Rowlett et al. | 717/143 |
| 2008/0216060 | A1 | * | 9/2008  | Vargas         | 717/137 |
| 2008/0313282 | A1 | * | 12/2008 | Warila et al. | 709/206 |
| 2010/0146492 | A1 |   | 6/2010  | Shacham et al. |        |

* cited by examiner

*Primary Examiner* — Don Wong
*Assistant Examiner* — Mohammad Kabir
(74) *Attorney, Agent, or Firm* — Novak Druce Connolly Bove + Quigg LLP

(57) ABSTRACT

Embodiments of the methods and apparatus for automatic cross language program code translation are provided. One or more characters of a source programming language code are tokenized to generate a list of tokens. Thereafter, the list of tokens is parsed to generate a grammatical data structure comprising one or more data nodes. The grammatical data structure may be an abstract syntax tree. The one or more data nodes of the grammatical data structure are processed to generate a document object model comprising one or more portable data nodes. Subsequently, the one or more portable data nodes in the document object model are analyzed to generate one or more characters of a target programming language code.

51 Claims, 8 Drawing Sheets

METHODS AND APPARATUS FOR AUTOMATIC TRANSLATION OF A COMPUTER PROGRAM LANGUAGE CODE

CROSS-REFERENCE TO RELATED APPLICATION

This application draws priority from U.S. Provisional Patent Application No. 61/132,264, filed on Jun. 16, 2008, and hereby incorporated by reference herein in its entirety.

FIELD OF THE INVENTION

The invention relates to computer aided translation of programming languages and more specifically the invention relates to real-time automatic translation of computer programming language code.

BACKGROUND OF THE INVENTION

Various users across the globe communicate or perform various activities on computer and device networks. Moreover, the users interact with each other through the networks, such as the Internet. Typically, the users use devices like personal computers to interact over the Internet. The users can interact from various Internet websites or social networking sites, for example, Facebook, Myspace, Hi5, and Orkut etc. Recently, the development in mobile devices such as cell phones, smartphones and PDAs, computers, laptops and the like has enabled them to be used for performing various activities on networks such as the Internet. Moreover, the mobile devices can be used for real-time interaction with other users on the network. The interaction or communication can be in the form of chatting, playing interactive online games, browsing, shopping, music, video, banking, business and the like.

The rapid pace of innovation in technology has generated various types of devices and platforms. Moreover, the number of devices is increasing rapidly. For example, there are various operating systems available for the devices such as Windows, Linux, Macintosh, and Symbian, etc. Moreover, a large number of J2ME platforms are available for the mobile devices such as cell phones. Furthermore, the mobile devices have a wide rage of capabilities in terms of screen size, screen type, screen resolution, processor, and memory etc. The applications for these devices have to be developed based on their platforms. Therefore, each application has to be ported to other platforms. For example, in case of computer games the programming languages typically used are JAVA, C#, C++, Action Script, and the like. Therefore, an application developed in Action Script programming language may have to be ported to other programming language when not supported by a device platform. Further, new applications are being continuously developed for different device platforms.

Typically, the programming code of an application is translated manually from one programming language to another. However, manual translation requires specific and in-depth knowledge of the programming languages of the different operating systems. Moreover, manual translation is a very time consuming process. Furthermore, the programming languages are constantly developed or get modified. Moreover, the applications have to be developed on specific development platforms compatible with the programming language used for development and the operating system of a device. As a result, a completed revision of the application code may be required to make the interaction possible. Some mechanisms, such as emulation of applications are available to support multiple devices. However, the existing mechanisms generate application program codes that are large or require heavy processing time. The problem is compounded with the continuously increasing number of device platforms and technology.

A mechanism is therefore desirable to automate the task of cross translating one programming language into another.

SUMMARY

The invention provides a method for automatic translation of a computer program language code. The method comprises tokenizing one or more characters of a source programming language code to generate a list of tokens. The list of tokens is parsed to generate an abstract syntax tree, wherein the abstract syntax tree comprises one or more data nodes. Thereafter, the one or more data nodes of the abstract syntax tree are processed to generate a document object model, wherein the document object model comprises one or more portable data nodes. Subsequently, the one or more portable data nodes in the document object model are analyzed to generate one or more characters of a target programming language code.

The invention further provides a computer-implemented method for automatic translation of a computer program language code for real-time applications. The computer implemented method comprises tokenizing one or more characters of a source programming language code to generate a list of tokens based on a set of expression rules. The list of tokens is parsed to generate an abstract syntax tree based on a set of grammar rules, wherein the abstract syntax tree comprises one or more data nodes. Thereafter, the one or more data nodes of the abstract syntax tree are processed to generate a document object model, wherein the document object model comprises one or more portable nodes. Subsequently, the one or more portable nodes of the document object model are analyzed to generate one or more characters of a target programming language code.

The present invention further provides an apparatus for automatic translation of a computer program language code. The apparatus comprises a tokenizer configured tokenize one or more characters of a source programming language code to generate a list of tokens. Further, the apparatus comprises a parser configured to parse the list of tokens to generate an abstract syntax tree, wherein the abstract syntax tree comprises one or more data nodes; a generator configured to process the one or more data nodes of the abstract syntax tree to generate a document object model, wherein the document object model comprises one or more portable data nodes; and an analyzer configured to process the one or more portable data nodes in the document object model to generate one or more characters of a target programming language code.

The present invention further provides a computer-readable medium having computer-executable instructions for performing a method for language translation of a computer program code, said method comprising the steps of: tokenizing one or more characters of a source programming language code to generate a list of tokens based on a set of expression rules; parsing the list of tokens to generate an abstract syntax tree based on a set of grammar rule, wherein the abstract syntax tree comprises one or more data nodes; processing the one or more data nodes of the abstract syntax tree to generate a document object model, wherein the document object model comprises one or more portable nodes; and analyzing the one or more portable nodes of the document object model to generate one or more characters of a target programming language code.

The present invention further provides a computer-implemented system for automatic translation of a computer program language code, comprising: means for tokenizing one or more characters of a source programming language code to generate a list of tokens; means for parsing the list of tokens to generate an abstract syntax tree, wherein the abstract syntax tree comprises one or more data nodes; means for processing the one or more data nodes of the abstract syntax tree to generate a document object model, wherein the document object model comprises one or more portable data nodes; and means for analyzing the one or more portable data nodes in the document object model to generate one or more characters of a target programming language code.

BRIEF DESCRIPTION OF THE DRAWINGS

Figure 1:
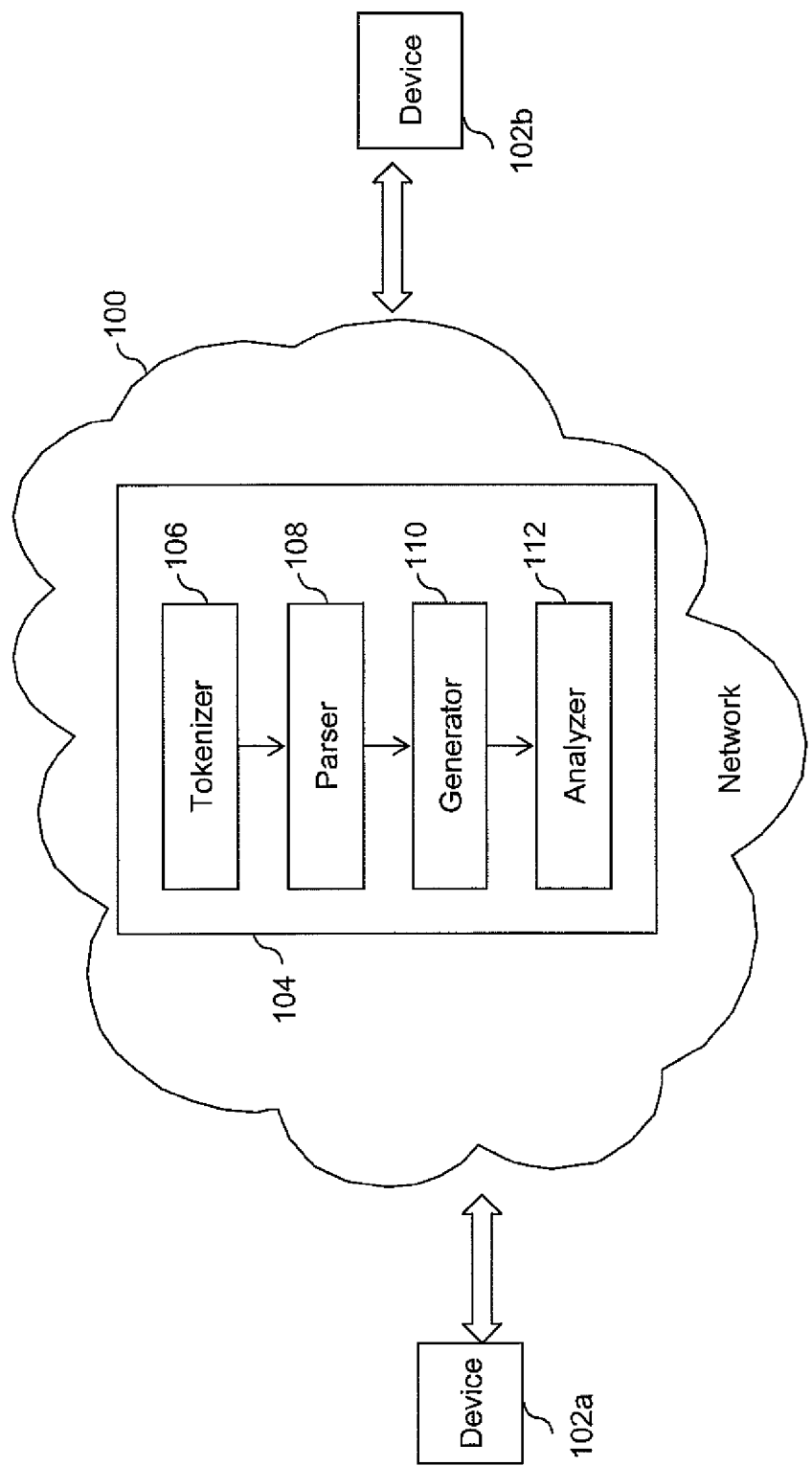
Figure 2:
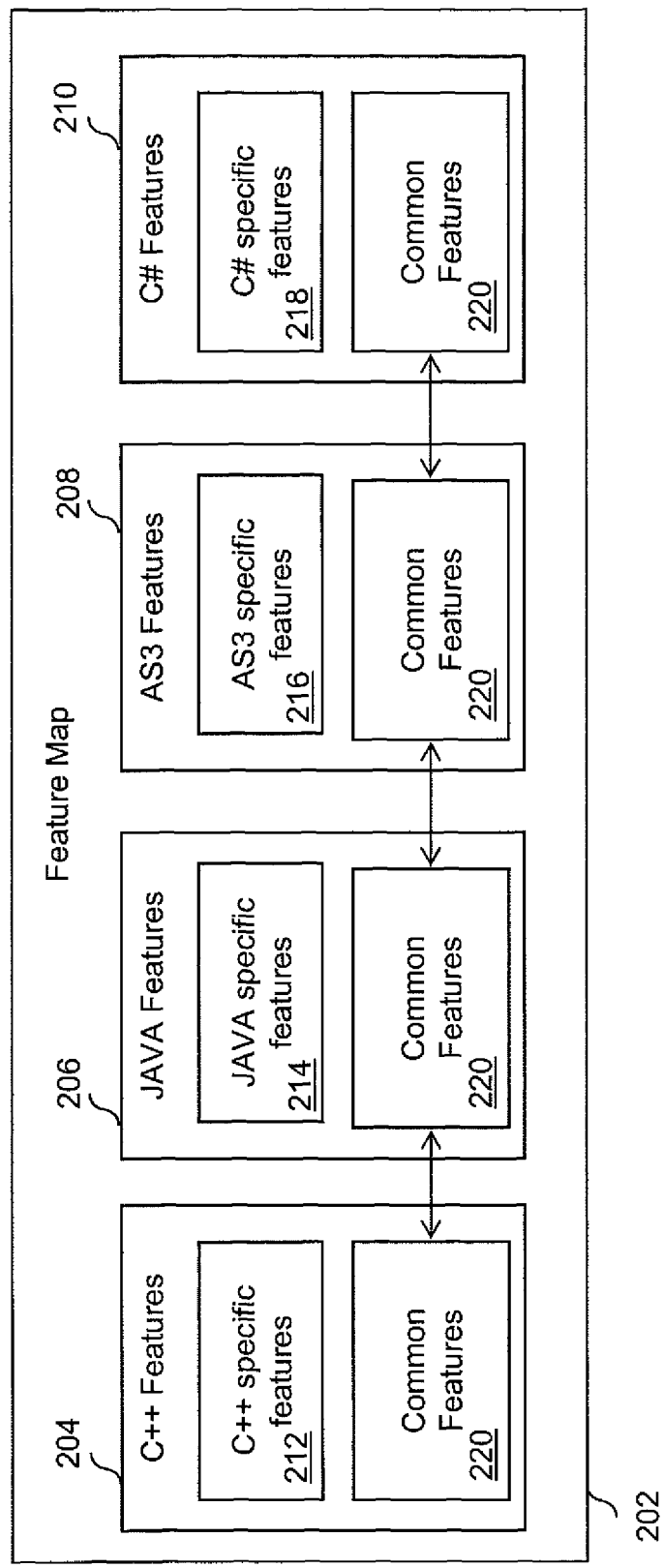
Figure 3:
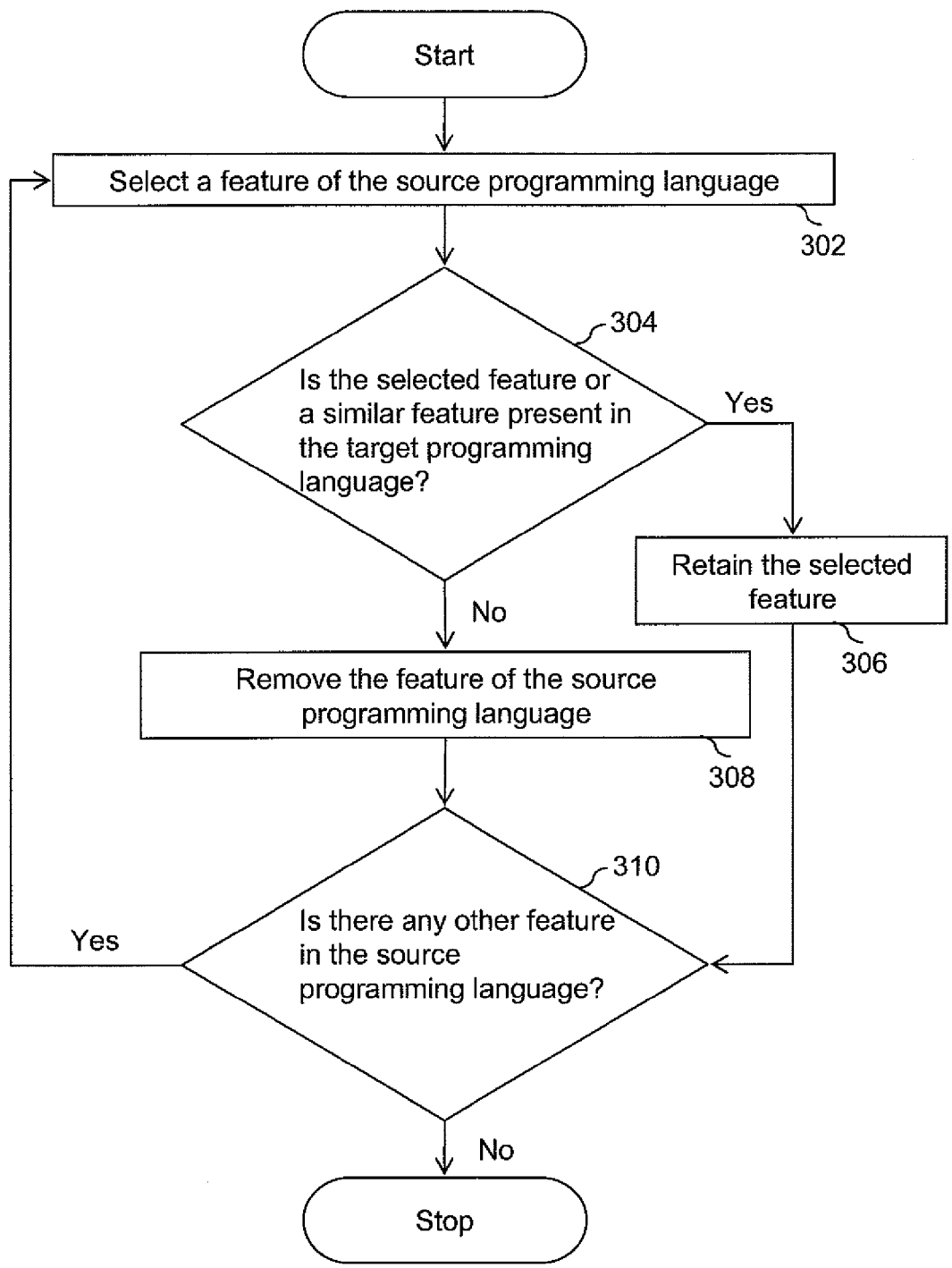
Figure 4:
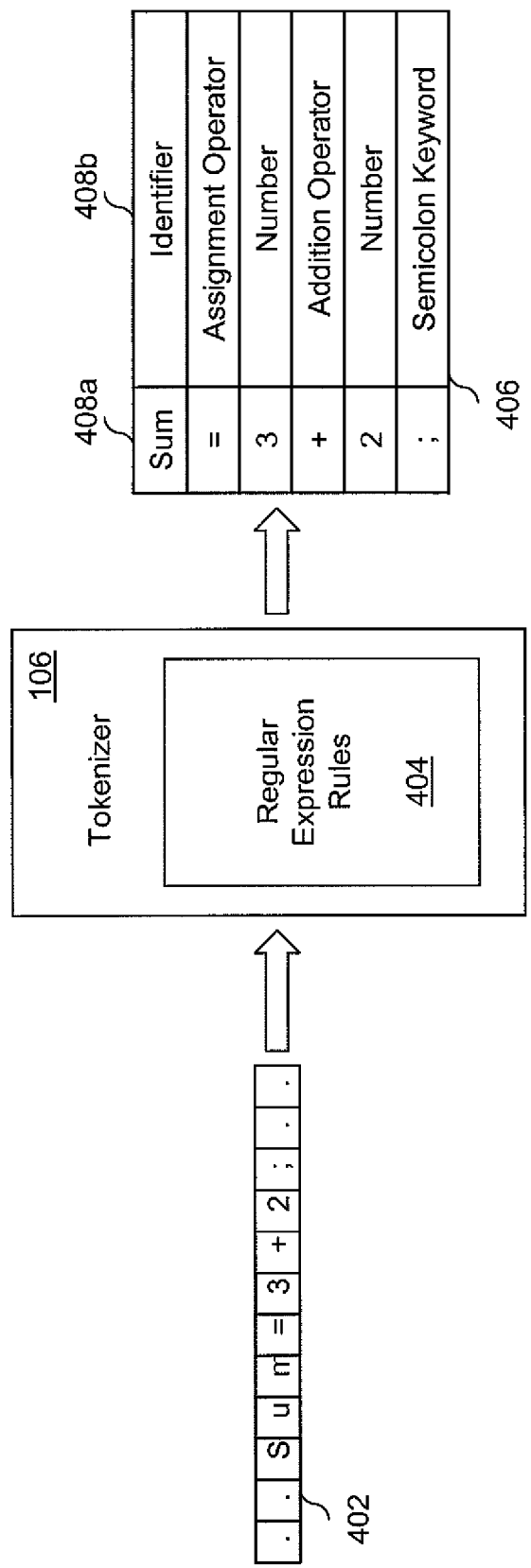
Figure 5:
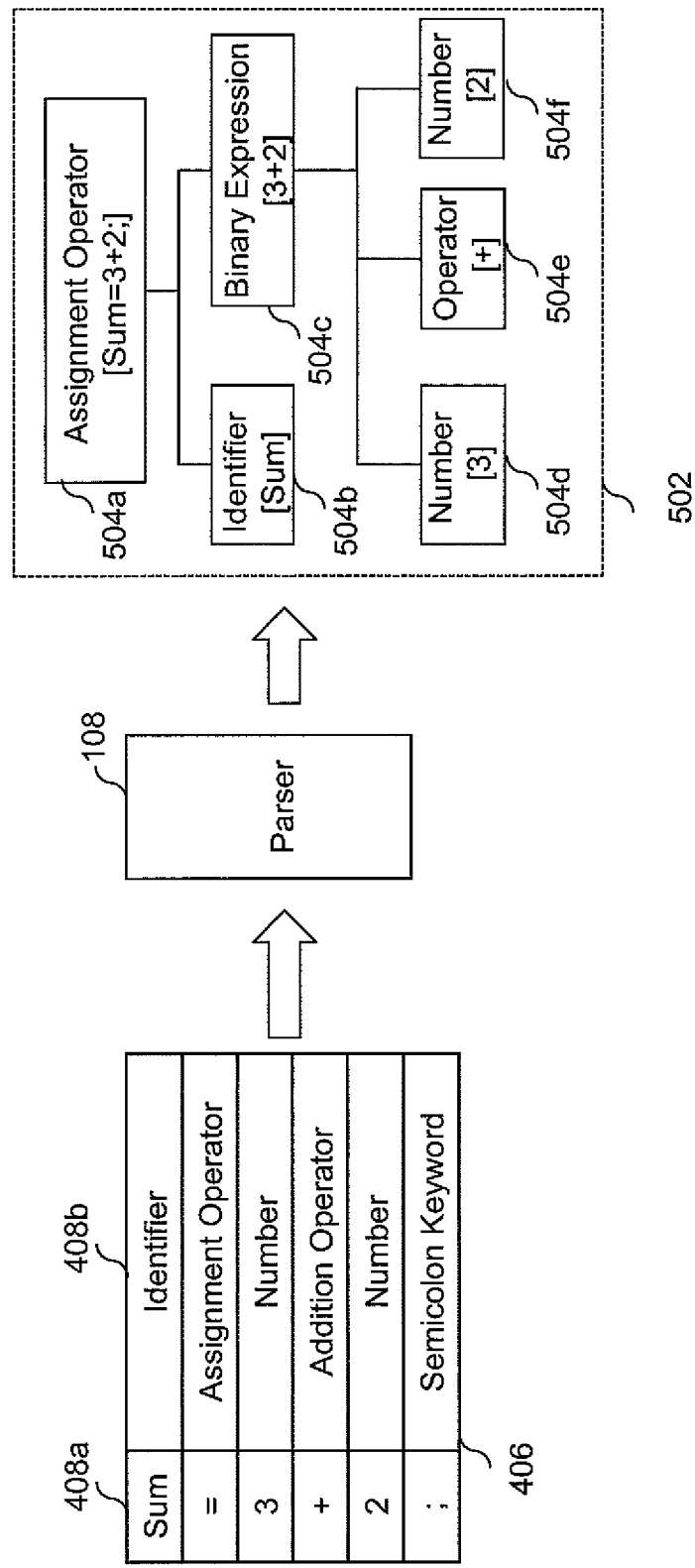
Figure 6:
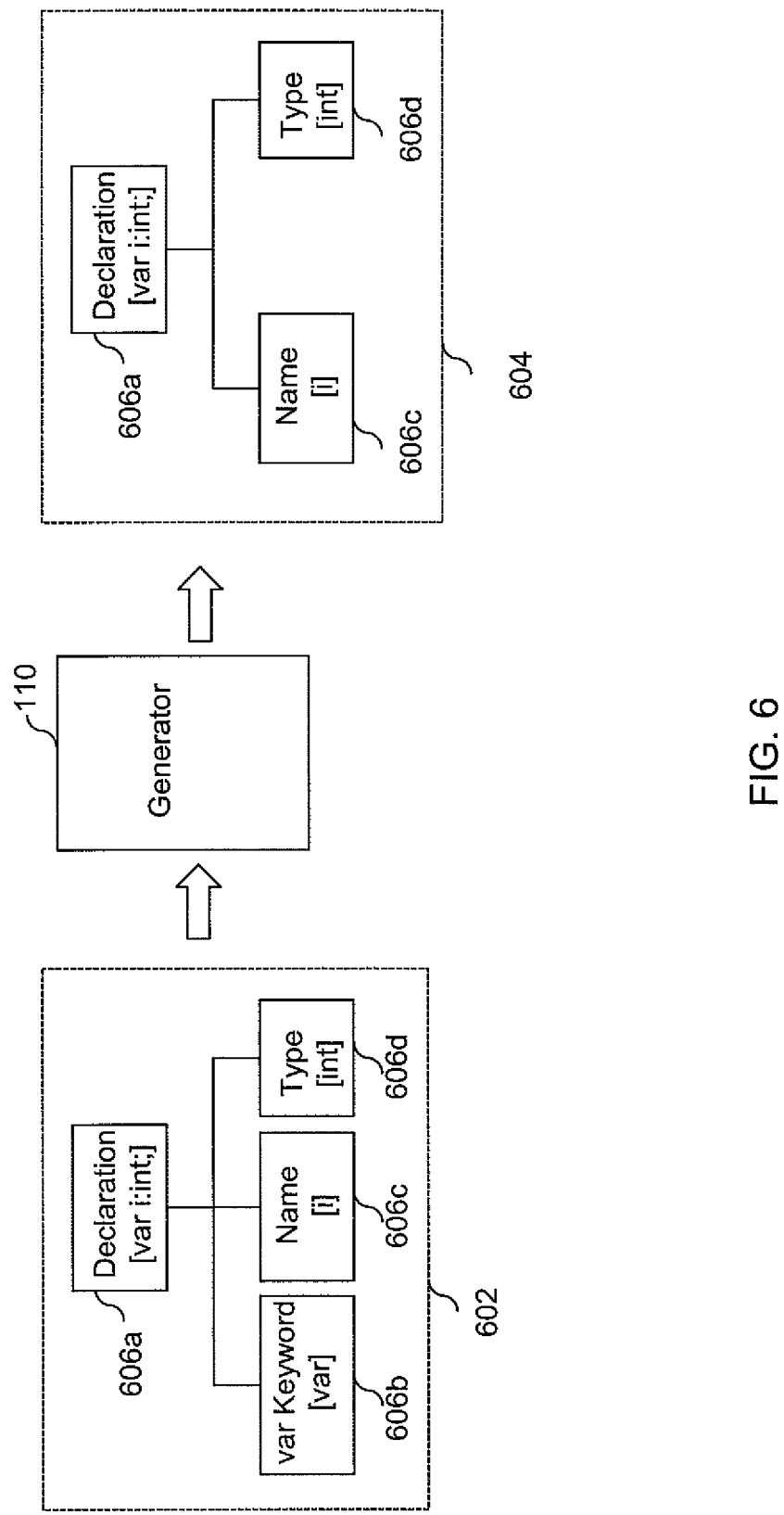
Figure 7:
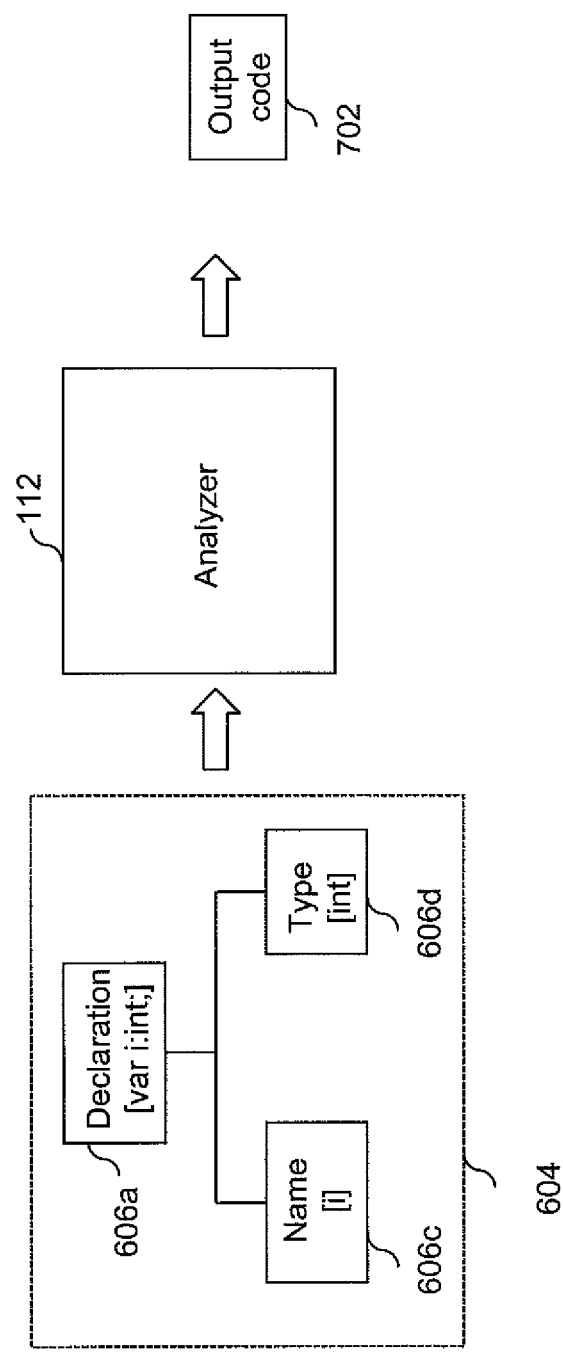
Figure 8:
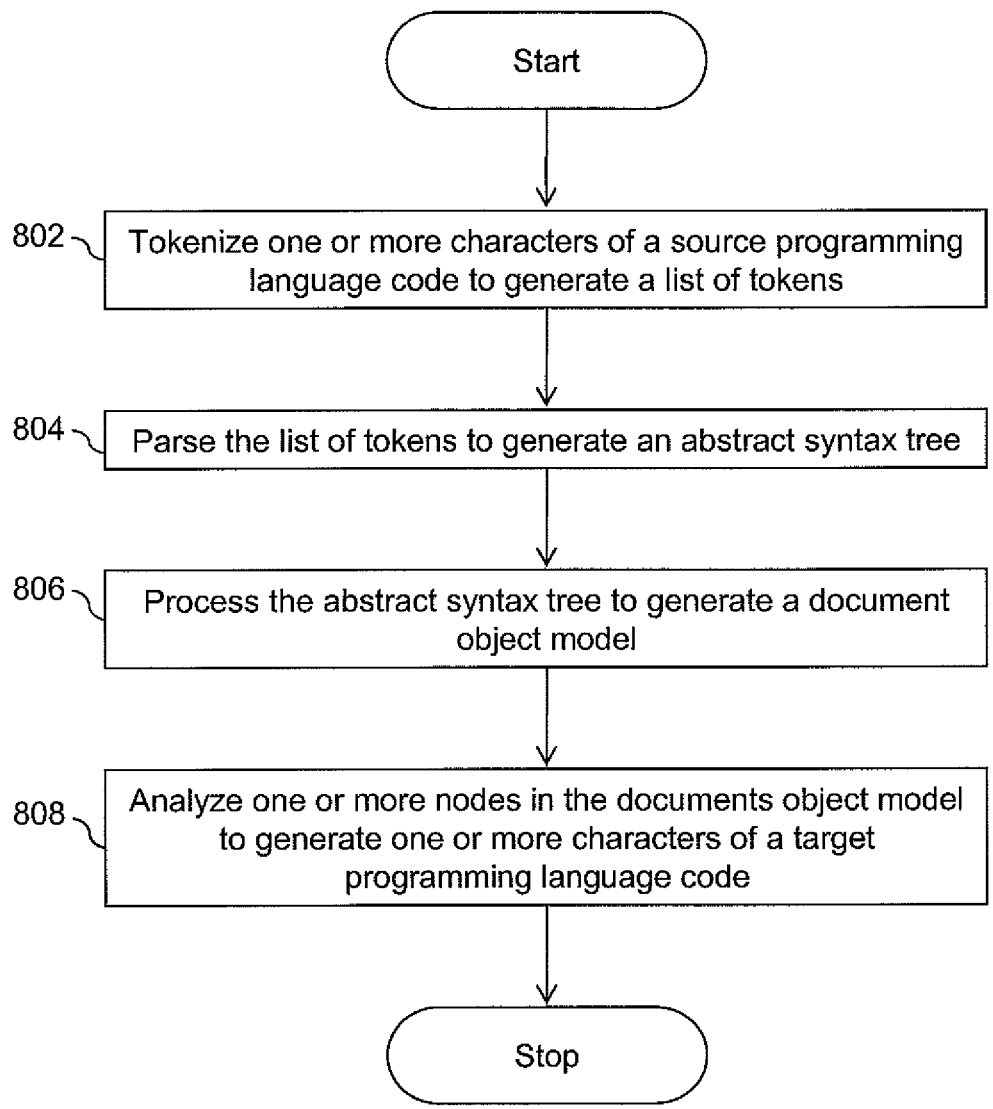

Having thus described the invention in general terms, reference will now be made to the accompanying drawings, which are not necessarily drawn to scale, and wherein:

FIG. 1 is a functional overview of an apparatus for automatic translation of a source programming language code to a target programming language, in accordance with an embodiment of the invention;

FIG. 2 illustrates an exemplary feature map for a programming language code, in accordance with an embodiment of the invention;

FIG. 3 illustrates a flowchart diagram for normalizing a source programming language code, in accordance with an embodiment of the invention;

FIG. 4 illustrates operation of a tokenizer, in accordance with an embodiment of the invention;

FIG. 5 illustrates operation of a parser, in accordance with an embodiment of the invention;

FIG. 6 illustrates operation of a generator, in accordance with an embodiment of the invention;

FIG. 7 illustrates operation of an analyzer, in accordance with an embodiment of the invention; and FIG. 8 illustrates a flowchart diagram for translation of a source programming language code to a target programming language, in accordance with an embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1 is a functional overview of an apparatus 104 for automatic translation of a source programming language code to a target programming language. As shown, device 102a and 102b may communicate to interact and share information. Devices 102a and 102b can be, but not limited to a mobile phone, a laptop, a personal computer, a smartphone and the like. In an embodiment of the invention, devices 102a and 102b are mobile devices communicating through network 100. Similarly, various other devices can be connected over network 100. Devices 102a and 102b may interact with each other by using applications such as chatting, games, messaging, and so forth. Devices 102a-b may have different hardware and software platforms. Examples of software platforms include operating systems such as Windows, Linux, Macintosh, Symbian, and so forth. Moreover, devices 102a-b may have different hardware such as the screen size, screen resolution, audio and video functionality, processors and so forth. Therefore, the applications executing on the devices 102a and 102b have to be compatible with the operating systems and platform of these devices.

The compatibility of the application may be maintained by translating the programming language code of the application based on the platforms of device 102a to 102b. Examples of the application include software games or rich media applications. In case of software games or rich media, the development environment can be typically divided into four object oriented programming languages: C++, JAVA, Action Script, and C#. Therefore, translation of programming language code is generally required across these object oriented programming languages. Moreover, these object oriented programming languages share various similar features and thus can be translated into one another. For example, each of the above programming languages share the features such as 'if statement', 'arguments', 'binary expressions', and so forth. Exemplary feature map for the above mentioned programming languages is explained in detail in conjunction with FIG. 2.

Apparatus 104 automatically translates the programming language code of the application for devices 102a and 102b. As shown in FIG. 1, apparatus 104 comprises a tokenizer 106, parser 108, a generator 110, and an analyzer 112. Apparatus 104 is hereinafter referred to as translator 104. Tokenizer 106 transforms streams of characters from the source programming language code into a list of tokens. In an embodiment of the invention, the source programming language is a computer game development language. Exemplary operation of tokenizer 106 is explained in detail in conjunction with FIG. 4. Parser 108 analyzes the list of tokens generated by tokenizer 106 to determine a grammatical data structure. The grammatical data structure is defined on the basis of the programming languages to be cross-translated. The grammatical data structure is hereinafter referred to as an Abstract Syntax Tree (AST). Exemplary operation of parser 108 is explained in detail in conjunction with FIG. 5. Generator 110 operates on the AST generated by parser 108 to generate a Document Object Model (DOM). The DOM is a simplified data structure of the AST. Exemplary operation of generator 110 is explained in detail in conjunction with FIG. 6. The DOM is transformed by analyzer 112 into programming code of a target programming language. Exemplary operation of analyzer 112 is explained in detail in conjunction with FIG. 7. Consequently, the programming code of the source programming language is translated into the programming code of the target programming language by translator 104. In an embodiment of the invention, the source programming language is a computer game development language.

FIG. 2 shows an exemplary feature map 202 for programming languages. Different programming languages comprise different features. However, various features in the object oriented programming languages may be similar or common. Generally, a feature in one programming language can be emulated in other programming languages. For example, a feature in Action Script 3 (AS3) programming language, the 'star notation' can be emulated by the 'void*' feature in C++ or 'object' feature in JAVA programming language. As another example, 'pure virtual' feature in C++ programming language can be emulated by 'assert(false)' feature in AS3 programming language. Moreover, the features of one programming language can be mapped equivalently to features of the other programming languages without emulation. The programming languages that have common features or the features can be mapped to each other are referred to as equivalent programming languages.

As shown, in FIG. 2, feature map 202 is drawn for C++, JAVA, Action Script 3 (AS3), and C# programming languages. However, feature map 202 is not limited to these programming languages only. Feature map 202 comprises C++ features 204, JAVA features 206, AS3 features 208, and C# features 210. C++ features 204 comprise C++ specific features 212. Similarly, JAVA specific features 214, AS3 specific features 216, and C# specific features 218 are the features that are specific to these programming languages only. Examples of C++ specific features 212 include, but are not limited to 'operator overloading, 'function overloading', 'templates' and so forth. Examples of JAVA specific features 214 include, but are not limited to 'function overloading', 'generics', 'iterators' and so forth. Examples of AS3 specific features 216 include, but are not limited to 'rest notation, 'start expression, 'for-in statement' and so forth. Examples of C# specific features 218 include, but are not limited to 'reflection' and so forth. Programming language specific features such as C++ specific features 212, JAVA specific features 214, AS3 specific features 216, and C# specific features 218, may require different run-time environment requirements. For example, emulating generic data types for a target programming language may require significant code space. Similarly, emulation of a target programming language code that does not involve the concept of threads may require huge processing overhead. As yet another example, LISP is a programming language that contains various high level functionalities. Moreover, the design of LISP programming language is different from programming languages such as JAVA, C++, C#, and the like. Therefore, emulation of a programming code written in LISP may require huge overhead for programming language code space and processing resources. The programming languages that do not have common features or the features cannot be mapped to each other are referred to as non-equivalent programming languages.

As shown in FIG. 2, feature map 202 comprises common features 220 for each of the programming languages. Common features 220 are the features that are common to these programming languages. Therefore, common features 220 can be cross-translated across these programming languages. In an embodiment of the invention, common features 220 can be emulated across these programming languages. Examples of common features 220 include, but are not limited to 'access visibility', 'arguments', 'Boolean literal', 'member', 'method', 'switch statement', 'if statement', and so forth. Common features 220 can be translated between the programming languages without losing performance, i.e., space usage or processing resources and processing time.

Analysis of common features 220 enable the assessment of the portability of the programming languages. Moreover, the object oriented programming languages can be made portable by analyzing the common features 220 and normalizing the programming languages. The normalizing of programming languages is discussed in conjunction with FIG. 3.

FIG. 3 illustrates a flowchart diagram for normalizing the source programming language according to an embodiment of the invention. The source programming language and the target programming language include features or functions that enable the development of rich media content applications. In an embodiment of the invention, the source programming language and the target programming language are object oriented programming languages. The source programming language and the target programming language may have some common features. Further, some features in the source programming language may be equivalent to the features of the target programming language. The features in the source programming language that are common or equivalent to the features in the target programming language are hereinafter referred to as equivalent features. Moreover, some feature of the source programming language may not be available or supported in the target programming language. The features of the source programming language that are not available or supported in the target programming language are hereinafter referred to as non-equivalent features. In an embodiment of the invention, the features and corresponding definitions of the features for the source and the target programming languages are maintained in a database. The source programming language is normalized based on the equivalent and non-equivalent features. In an embodiment of the invention, the programming languages are normalized by a normalizer. The normalizer is a module in translator 104, which processes the features of the source and the target programming languages.

At step 302, a feature of the source programming language is selected. Thereafter, at step 304 it is determined if the feature is available in the target programming language. At step 306, the selected feature from the source programming language is matched with the features of the target programming language. Therefore, in case an equivalent feature is available in the target programming language, then the equivalent feature is retained. In an embodiment of the invention, the features are matched on the basis of feature definition. In another embodiment of the invention, the features are matched based on semantic meaning of the definition. In yet another embodiment of the invention, the features are mapped based on the output received from execution of the features.

In case the feature is non-equivalent to features in the target programming language, then the non-equivalent feature is removed, at step 308. In an embodiment of the invention, the non-equivalent features are replaced with an equivalent feature of the target programming language.

Subsequently, at step 310 it is determined if other features in the source programming language required to be processed. Thereafter, the above steps are performed iteratively to process all the features of the source programming language. As a result, the source and the target programming languages are made equivalent and can be cross-translated.

FIG. 4 illustrates operation of tokenizer 106, in accordance with an embodiment of the invention. As shown, tokenizer 106 comprises a collection of regular expression rules 404. In an embodiment of the invention, tokenizer 106 is a lexical analyzer. Regular expression rules 404 define a finite state machine for tokenizer 106. Regular expression rules 404 represent patterns that may be contained in text analyzed by tokenizer 106. Example definitions of various types of regular expressions may be:

Identifier: is a sequence of letters 'a'-'z' or 'A'-'Z'.
Assignment operator: is the character '='
Addition operator: is the character '+'
Semicolon: is the character ';'
Number: is a sequence of characters '0'-'9'

The programming code of source programming language is processed as stream of characters by tokenizer 106. An input stream 402 of characters represent an expression in the source programming code: 'Sum=2+3;'. As shown in FIG. 2, input stream 402 comprises the regular expression as input characters 'S','u','m','=',2,'+',3, and ';'. Input stream 402 is scanned one input character at a time by tokenizer 106. The scanned input stream 402 is processed on the basis of regular expression rules 404. As a result, a list of tokens 406 is generated. Therefore, every time a rule in regular expression rules 404 is completed a new token is added to the output list.

In an embodiment of the invention, list of tokens 406 comprises columns of token list 408a and token type list 408b. Token list 408a comprises the tokens generated from input stream 402 and the token type list 408b comprises the description for the type of tokens. Tokens in list of tokens 406 are categorized block of text. Referring to list of tokens 406, the token 'Sum' in tokens 408a is defined by tokenizer 106 as an 'identifier' in type 408b. Similarly, the complete programming code of the source programming language can be processed to form a list of tokens. Subsequently, list of tokens 406 is processed by parser 108 to generate structured information.

FIG. 5 illustrates operation of parser 108, in accordance with an embodiment of the invention. List of tokens 406 generated by tokenizer 106 does not provide any information on contextual correctness of the tokens. Therefore, the order of tokens in the list may not be contextually correct. For example, the expression 'Sum 3+=2;' is not a correct expression. However, this expression can be processed by tokenizer 106 to generate a list of tokens. Parser 108 analyzes list of tokens 406 generated by tokenizer 106. In an embodiment of the invention, parser 108 performs syntactic analysis of list of tokens 406. Parser 108 can implement top-down parsing, in an embodiment of the invention. Therefore, tokens in list of tokens 406 are consumed from left to right. In another embodiment of the invention, parser 108 can implement bottom-up parsing. Therefore, parser 108 locates the basic elements in list of tokens 406 and then locates the elements containing the basic elements.

Parser 108 analyzes list of tokens 406 to generate an Abstract Syntax Tree (AST) 502. AST 502 is a grammatical data structure and defines the relationship between the tokens in list of tokens 406. AST 502 is generated based on grammar rules defined in parser 108. The grammar defined in parser 108 can be context-free grammar or attribute grammar.

Exemplary grammar rules in parser 108 include:
Assignment Statement←Identifier=Expression;
Expression←Literal OR Binary Expression
Binary Expression←Expression Operator Expression
Literal←Number OR Identifier
The arrows in the above rules indicate the direction of the pattern matching reduction. Therefore, based on the above example a statement such as 'Sum=3+2' is termed as an assignment statement. Similarly, based on the above rules, the statement '3+2' is termed as a Binary Expression.

The grammar rules in parser 108 can be recursive. Therefore, one or more rules may be applied recursively on an expression to prepare AST 502. AST 502 comprises data nodes 504. Data nodes 504 comprise a hierarchal data structure that represents the structure of the program code. For example, data node 504c comprises binary expression and data nodes 504d, 504e, and 504f comprise number and operator, which are subsets of the binary expression. In an embodiment of the invention, the grammar rules can reference token definition rules to define data nodes of AST 502. Therefore, AST 502 comprises structural information and relation between data nodes 504. In an embodiment of the invention, parser 108 can be programmed based on the rules required for analyzing list of tokens 406.

FIG. 6 illustrates operation of generator 110, in accordance with an embodiment of the invention. Generator 110 operates on AST 602 to generate a Document Object Model (DOM) 604. DOM 604 is a simplified data structure of AST 602. As shown in FIG. 6, AST 602 is an exemplary data structure representation of a variable declaration in the Action Script 3 (AS3) programming language. The variable declaration for this example in AS# programming language is 'var i:int;'.

Data node 606a of AST 602 is referred to as the parent node of data nodes 606b, 606c, and 606d. Generator 110 analyzes AST 602 to identify portable data nodes. Data nodes 606a-d in AST 602 comprises meta structure and metadata of the programming code. However, the metadata may not be required for generation of DOM 604, as the meta-structure is deduced from the other data nodes in AST 602. Therefore, data node 606b is removed by generator 110, because data node 606a is a declaration node and the meta-structure of data node 606b can be deduced from node 606a. Therefore, DOM 604 contains only portable data nodes from AST 602. As a result, DOM 604 includes a simple data structure of the programming code and is generic to any programming language. The above example explains the operation of generator 110 from the perspective of AS3 programming language. However, the same process can essentially be performed on an AST developed for any programming language code and is not limited to any particular programming language code.

FIG. 7 shows operation of analyzer 112 according to an exemplary embodiment of the invention. Analyzer 112 processes a document object model to generate programming code in the target programming language. Analyzer 112 processes the structure of DOM 604 to translate the input code of source programming language into an output code 702 corresponding to the target programming language. Output code 702 is generated based on the features of the target programming language. For example, output code 702 may be 'int i' in case the target programming language is JAVA. Analyzer 112 processes the portable data nodes of DOM 604 in a standard depth first manner. Therefore, as shown for DOM 604, portable data node 606a, which is the parent node, is processed first followed by portable data nodes 606c and 606d.

Analyzer 112 processes nodes 606 to generate tokens corresponding to a DOM node in the target programming language code. In an embodiment of the invention, to generate DOM of the target programming language, analyzer 112 executes functions that map between the meta-structure of the source programming language feature and the character stream of the target programming language. Therefore, DOM 604 is parsed to generate an abstract syntax tree and thereafter, the abstract syntax tree is converted to programming code of the target programming language by analyzer 112. In an embodiment of the invention, the processing by analyzer 112 comprises recursive scanning of DOM 604 to generate the target programming language code. Example pseudo-code of functions that analyzer 112 executes for translating DOM 604 to AS3 or Java are discussed below:

Example 1

Functions for Conversion of DOM 604 to Java Programming Language

```
1    Function DeconstructASTToJava(node)
2    {
3        If (node is of type Declaration)
4            Print(DeconstructDeclarationToJava(node))
5        Else
6            ....
7    }
8    Function DeconstructDeclarationToJava (node)
9    {
10       Print(DeconstructType(node.getChild(1)));
```

```
11              Print(" ");
12              Print(DeconstructName(node.getChild(0)));
13              Print(";");
14          }
```

Analyzer 112 may run the functions in example 1 on DOM 604 to generate output code 702. As shown in example 1, the function DeconstructASTToJava(node) is defined in the lines 1 to 7. This function reads the parent node of DOM 604, which is portable data node 606a and calls the function DeconstructDeclarationToJava(node) defined in the lines 8 to 14, when portable data node 606a is a type of declaration. The function DeconstructDeclarationToJava(node) reads the child nodes in DOM 604, which are portable data nodes 606c and 606d. Subsequently, the function DeconstructDeclarationToJava(node) generates output code 702. In this case output code 702 is 'int i;', which is a proper integer declaration in JAVA programming language. Similarly, various other functions can be written to analyze other types of data nodes in the tree structure of DOM 604 and completely translate source programming language code to target programming language code.

Example 2

Functions for Conversion of DOM 604 to ActionScript3 Programming Language

```
1       Function DeconstructASTToAS3 (node)
2       {
3           If (node is of type Declaration)
4               Print(DeconstructDeclarationToAS3(node));
5           Else
6               ....
7       }
8       Function DeconstructDeclarationToAS3 (node)
9       {
10          Print("var ");
11          Print(DeconstructType(node.getChild(1)));
12          Print(":");
13          Print(DeconstructName(node.getChild(2)));
14          Print(";");
15      }
```

Analyzer 112 may run the functions in example 2 on DOM 604 to generate output code 702. As shown in example 2, the function DeconstructASTToAS3(node) is defined in the lines 1 to 7. This function reads the parent node of DOM 604, which is portable data node 606a and calls the function DeconstructDeclarationToAS3(node) defined in the lines 8 to 15, when portable data node 606a is a type of declaration. The function DeconstructDeclarationToAS3(node) reads the child nodes in DOM 604, which are portable data nodes 606c and 606d. Subsequently, the function DeconstructDeclarationToAS3(node) generates output code 702. In this case output code 702 is 'var: int i;', which is a proper integer declaration in AS3 programming language. Similarly, various other functions can be written to analyze other types of data nodes in the tree structure of DOM 604 and completely translate source programming language code to target programming language code. In an embodiment of the invention, DOM 604 can be analyzed to generate an output code in any other equivalent programming language.

FIG. 8 illustrates a flowchart diagram for cross translation of the source programming language code to a target programming language code, in accordance with an embodiment of the invention. At step 802, an input stream of one or more characters of a source programming language code is received at tokenizer 106. Subsequently, the input stream is analyzed lexically to generate a list of tokens. Examples of the characters in the input stream include alphabets, numerals, special characters, mathematical operators, their combination and so forth. In an embodiment of the invention, the characters are processed sequentially to generate the list of tokens.

The order of tokens in the list of tokens may not be contextually correct. Therefore, the list of token is analyzed syntactically by parser 108 to generate a grammatical data structure, at step 804. In an embodiment of the invention, the grammatical data structure is a hierarchical data structure and is referred to as an Abstract Syntax Tree (AST). Thereafter, at step 806, the AST is processed by generator 110 to generate a document object model. Document object model is a simplified grammatical data structure in a hierarchical data structure format. Subsequently, the document object model is processed by analyzer 112 to generate a target list of tokens. The target list of tokens is thereafter processed by analyzer 112 to generate the target programming language code, at step 808.

Embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions may be loaded onto one or more general purpose computers, special purpose computers, or other programmable data processing translator to produce machines, such that the instructions which execute on the computers or other programmable data processing translator create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. Furthermore, such computer program instructions may be made available for download and/or downloaded over a communication network.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A method, executed by electronic computer hardware in combination with software, for automatic translation of a computer program language code, comprising:

tokenizing one or more characters of a source programming language code to generate a list of tokens;
parsing the list of tokens to generate a grammatical data structure, wherein the grammatical data structure comprises one or more data nodes;
processing the one or more data nodes of the grammatical data, structure to generate a document object model, wherein the document object model comprises one or more portable data nodes; and
analyzing the one or more portable data nodes in the document object model to generate one or more characters of a target programming language code;
normalizing the source programming language, wherein one or more features of the source programming language are managed based on one or more features of the target programming language, comprising:
identifying one or more non-equivalent and one or more equivalent features from the one or more features in the source programming language, wherein the one or more non-equivalent features and the one or more equivalent features are identified based on the one or more features of the target programming language; and
removing the one or more non-equivalent features of the source programming language;
wherein equivalent features are features that are configured to be mapped the source programming language and the target programming language.

2. The method of claim 1, wherein the grammatical data structure comprises an abstract syntax tree.

3. The method of claim 1, wherein the source programming language and the target programming language are object oriented programming languages.

4. The method of claim 1, wherein the source programming language and the target programming language comprise one or more equivalent features.

5. The method of claim 1, further comprising downloading computer-executable instructions that, if executed by a computing device, cause the computing device to execute said normalizing.

6. The method of claim 1 wherein normalizing the source programming language comprises:
identifying one or more non-equivalent features from the one or more features in the source programming language, wherein the one or more non-equivalent features are identified based on the one or more features of the target programming language; and
replacing the one or more non-equivalent features with the one or more equivalent features of the source programming language.

7. The method of claim 1 further comprising emulating the source programming language, wherein one or more non-equivalent features of the source programming language are emulated.

8. The method of claim 1, wherein tokenizing comprises processing the one or more characters of the source programming language code based on a set of expression rules.

9. The method of claim 1, wherein parsing comprises processing the list of tokens based on a set of grammar rules.

10. A method, executed by electronic computer hardware in combination with software, for automatic translation of a computer program language code, comprising:
tokenizing one or more characters of a source programming language code to generate a list of tokens;
parsing the list of tokens to generate a grammatical data structure, wherein the grammatical data structure comprises one or more data nodes;
processing the one or more data nodes of the grammatical data structure to generate a document object model, wherein the document object model comprises one or more portable data nodes; and
analyzing the one or more portable data nodes in the document object model to generate one or more characters of a target programming language code;
wherein processing the one or more data nodes of the grammatical data structure comprises:
scanning the one or more data nodes in the grammatical data structure to identify one or more metadata nodes having a metadata structure that can be deduced from at least one declaration node; and
removing the one or more metadata nodes to generate the one or more portable data nodes, wherein the portable data nodes have a metadata structure that cannot be deduced from at least one declaration node.

11. The method of claim 1, wherein analyzing the one or more portable data nodes in the document object model comprises:
processing recursively the one or more portable data nodes in the document object model to generate a target list of tokens; and
analyzing the target list of tokens to generate the one or more characters of the target programming language code.

12. The method of claim 1, further comprising downloading computer-executable instructions that, if executed by a computing device, cause the computing device to execute said tokenizing.

13. The method of claim 1, further comprising downloading computer-executable instructions that, if executed by a computing device, cause the computing device to execute said parsing.

14. The method of claim 1, further comprising downloading computer-executable instructions that, if executed by a computing device, cause the computing device to execute said processing.

15. An apparatus including electronic computer hardware in combination with software, for automatic translation of a computer program language code, the apparatus comprising:
a tokenizer configured to tokenize one or more characters of a source programming language code to generate a list of tokens;
a parser configured to parse the list of tokens to generate a grammatical data structure, wherein the grammatical data structure comprises one or more data nodes;
a generator configured to process the one or more data nodes of the grammatical data structure to generate a document object model, wherein the document object model comprises one or more portable data nodes; and
an analyzer configured to process the one or more portable data nodes in the document object model to generate one or more characters of a target programming language code
wherein the generator is further configured to:
scan the one or more data nodes in the abstract syntax tree to identify one or more metadata nodes having a metadata structure that can be deduced from at least one declaration node; and
remove the one or more metadata nodes to generate the one or more portable data nodes having a metadata structure that cannot be deduced from at least one declaration node.

16. The apparatus of claim 15, wherein the source programming language and the target programming language comprise one or more equivalent features.

17. An apparatus including electronic computer hardware in combination with software, for automatic translation of a computer program language code, the apparatus comprising:
   a tokenizer configured to tokenize one or more characters of a source programming language code to generate a list of tokens;
   a parser configured to parse the list of tokens to generate a grammatical data structure, wherein the grammatical data structure comprises one or more data nodes;
   a generator configured to process the one or more data nodes of the grammatical data structure to generate a document object model, wherein the document object model comprises one or more portable data nodes; and
   an analyzer configured to process the one or more portable data nodes in the document object model to generate one or more characters of a target programming language code;
   a normalizer configured to:
      identify one or more non-equivalent and one or more equivalent features from the one or more features in the source programming language, wherein the one or more non-equivalent features and the one or more equivalent features are identified based on the one or more features of the target programming language; and
      remove the one or more non-equivalent features of the source programming language;
   wherein equivalent features are features that can be mapped between the source programming language and the target programming language.

18. The apparatus of claim 17, wherein the normalizer is further configured to remove the one or more non-equivalent features of the source programming language.

19. The apparatus of claim 15, wherein the tokenizer comprises a finite state machine.

20. The apparatus of claim 15, wherein the grammatical data structure comprises an abstract syntax tree.

21. The apparatus of claim 15, wherein the tokenizer is configured to process the one or more characters of the source programming language code based on a set of expression rules.

22. The apparatus of claim 15, wherein the parser is configured to process the list of tokens based on a set of grammar rules.

23. The apparatus of claim 15, wherein the generator is configured to scan the one or more data nodes in the grammatical data structure to identify one or more portable data nodes.

24. The apparatus of claim 15, wherein the analyzer is configured to recursively process the one or more portable data nodes in the document object model to generate a target list of tokens.

25. The apparatus of claim 15, further comprising an emulator configured to emulate one or more features non-equivalent of the source programming language.

26. The apparatus of claim 15, wherein the one or more data nodes in the abstract syntax tree represent a grammatical data structure of the list of tokens.

27. The apparatus of claim 15, wherein the analyzer is further configured to:
   process recursively the one or more portable data nodes in the document object model to generate a target list of tokens; and
   analyze the target list of tokens to generate the one or more characters of the target programming language code.

28. The apparatus of claim 15, wherein the source programming language and the target programming language are object oriented programming languages.

29. A non-transitory computer-readable medium having computer-executable instructions for performing a method for language translation of a computer program code, said method comprising:
   tokenizing one or more characters of a source programming language code to generate a list of tokens based on a set of expression rules;
   parsing the list of tokens to generate a grammatical data structure based on a set of grammar rule, wherein the grammatical data structure comprises one or more data nodes;
   processing the one or more data nodes of the grammatical data structure to generate a document object model, wherein the document object model comprises one or more portable nodes; and
   analyzing the one or more portable nodes of the document object model to generate one or more characters of a target programming language code;
   wherein processing the one or more data nodes of the grammatical data structure comprises:
      scanning the one or more data nodes in the grammatical data structure to identify one or more metadata nodes having a metadata structure that can be deduced from at least one declaration node; and
      removing the one or more metadata nodes to generate the one or more portable data nodes having a metadata structure that cannot be deduced from at least one declaration node.

30. The computer-readable medium of claim 29, wherein the grammatical data structure comprises an abstract syntax tree.

31. The computer-readable medium of claim 29, wherein the list of tokens is parsed based on a set of grammar rules.

32. The computer-readable medium of claim 29, wherein the source programming language is a computer-game development language.

33. The computer-readable medium of claim 29, wherein analyzing the one or more portable data nodes in the document object model comprises:
   processing recursively the one or more portable data nodes in the document object model to generate a target list of tokens; and
   analyzing the target list of tokens to generate the one or more characters of the target programming language code.

34. The computer-readable medium of claim 29, wherein the source programming language and the target programming language are object oriented programming languages.

35. A system including electronic computer hardware in combination with software, for automatic translation of a computer program language code, comprising:
   means for tokenizing one or more characters of a source programming language code to generate a list of tokens;
   means for parsing the list of tokens to generate a grammatical data structure, wherein the grammatical data structure comprises one or more data nodes;
   means for processing the one or more data nodes of the grammatical data structure to generate a document object model, wherein the document object model comprises one or more portable data nodes; and
   means for analyzing the one or more portable data nodes in the document object model to generate one or more characters of a target programming language code;
   wherein the means for processing the grammatical data structure comprises:
      means for scanning the one or more data nodes in the grammatical data structure to identify one or more metadata nodes having metadata structure that can be deduced from at least one declaration node; and means for removing the one or more metadata nodes to generate the one or more portable data nodes having a metadata structure that cannot be deduced from at least one declaration node.

36. The system of claim 35, wherein the grammatical data structure comprises an abstract syntax tree.

37. The system of claim 35, wherein the list of tokens comprises one or more categorized blocks of the one or more characters of the source programming language code.

38. The system of claim 35, wherein the source programming language is a computer-game development language.

39. The system of claim 35, wherein the target programming language is a computer-game development language.

40. The system of claim 35 further comprising means for normalizing the source programming language, wherein one or more features of the source programming language are managed based on one or more features of the target programming language.

41. The system of claim 40, wherein the means for normalizing the source programming language comprises:

means for identifying one or more non-equivalent and one or more equivalent features from the one or more features in the source programming language, wherein the one or more non-equivalent features and the one or more equivalent features are identified based on the one or more features of the target programming language; and means for removing the one or more non-equivalent features of the source programming language.

42. The system of claim 35, wherein the means for analyzing the one or more portable data nodes in the document object model comprises:

means for processing recursively the one or more portable data nodes in the document object model to generate a target list of tokens; and means for analyzing the target list of tokens to generate the one or more characters of the target programming language code.

43. The system of claim 35, wherein the source programming language and the target programming language are object oriented programming languages.

44. The method of claim 1, wherein the grammatical data structure defines a relationship between tokens in the list of tokens.

45. The method of claim 1, wherein the grammar rules applied in the parsing to generate the grammatical data structure can be context-free grammar or attribute grammar.

46. The apparatus of claim 15, wherein the grammatical data structure defines a relationship between tokens in the list of tokens.

47. The apparatus of 15, wherein the grammar rules applied by the parser to generate the grammatical data structure can be context-free grammar or attribute grammar.

48. The computer readable medium of claim 29, wherein the grammatical data structure defines a relationship between tokens in the list of tokens.

49. The computer readable medium of claim 1, wherein the grammar rules applied in the parsing to generate the grammatical data structure can be context-free grammar or attribute grammar.

50. The system of claim 35, wherein the grammatical data structure defines a relationship between tokens in the list of tokens.

51. The system of claim 35, wherein the grammar rules applied by the means for parsing to generate the grammatical data structure can be context-free grammar or attribute grammar.

* * * * *